(12) United States Patent
Djokovic et al.

(10) Patent No.: US 6,956,872 B1
(45) Date of Patent: Oct. 18, 2005

(54) SYSTEM AND METHOD FOR ENCODING DSL INFORMATION STREAMS HAVING DIFFERING LATENCIES

(75) Inventors: Igor Djokovic, Tustin, CA (US);
Patrick Duvaut, Eatontown, NJ (US);
Massimo Sorbara, Freehold, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 1047 days.

(21) Appl. No.: 09/862,911

(22) Filed: May 22, 2001

Related U.S. Application Data

(60) Provisional application No. 60/206,068, filed on May 22, 2000, provisional application No. 60/226,114, filed on Aug. 18, 2000.

(51) Int. Cl.[7] .................................... H04J 3/07
(52) U.S. Cl. ....................... 370/505; 714/755
(58) Field of Search ............... 370/203, 208, 370/466–467, 485, 505, 514, 540, 542; 714/755, 714/784; 375/265, 340

(56) References Cited

U.S. PATENT DOCUMENTS

| | | | | |
|---|---|---|---|---|
| 5,654,962 | A | | 8/1997 | Rostoker et al. ............ 370/232 |
| 5,737,337 | A | * | 4/1998 | Voith et al. ................. 714/702 |
| 5,970,098 | A | * | 10/1999 | Herzberg ..................... 375/262 |
| 5,996,104 | A | * | 11/1999 | Herzberg ..................... 714/755 |
| 6,034,996 | A | * | 3/2000 | Herzberg ..................... 714/784 |
| 6,088,387 | A | * | 7/2000 | Gelblum et al. ............ 375/265 |
| 6,219,386 | B1 | * | 4/2001 | Amrany et al. ............. 375/261 |
| 6,687,315 | B2 | * | 2/2004 | Keevill et al. .............. 375/341 |
| 6,715,124 | B1 | * | 3/2004 | Betts ........................... 375/265 |
| 6,769,090 | B1 | * | 7/2004 | Halder ......................... 714/795 |
| 2001/0031017 | A1 | * | 10/2001 | Betts ........................... 375/265 |
| 2004/0240590 | A1 | * | 12/2004 | Cameron et al. ........... 375/340 |
| 2005/0013379 | A1 | * | 1/2005 | Duvaut et al. .............. 375/259 |

* cited by examiner

*Primary Examiner*—Duc Ho
*Assistant Examiner*—Phuongchau Ba Nguyen
(74) *Attorney, Agent, or Firm*—Thomas, Kayden, Horstemeyer & Risley

(57) ABSTRACT

The present invention is generally directed to a system and method for encoding a DSL information bit stream and decoding a corresponding encoded DSL symbol. In accordance with one embodiment, an apparatus for encoding a DSL information bit stream is provided having a switch with an input configured to receive a DSL information bit stream and at least two outputs. An encoder is provided and coupled to a first output of the switch. A serial to parallel converter is provided and coupled to both an output of the encoder and a second output of the switch. Finally, a mapper is provided and coupled to an output of the serial to parallel converter through multiple paths. Preferably, a first coupling path between the serial to parallel converter and the mapper is a direct path and a second coupling path includes a second encoder.

20 Claims, 7 Drawing Sheets

SYSTEM AND METHOD FOR ENCODING DSL INFORMATION STREAMS HAVING DIFFERING LATENCIES

CROSS-REFERENCE TO RELATED APPLICATIONS

This application claims the benefit of U.S. provisional patent application Ser. 60/206,068, filed on May 22, 2000, and entitled "Block Product Turbo BCH Codes and QAM Soft Demapper for DSL DMT," which is hereby incorporated by reference in its entirety. This application also claims the benefit of U.S. provisional patent application Ser. 60/226,114, filed on Aug. 18, 2000, and entitled "Multiple Latencies Multilevel Turbo Coding for DSL," which is hereby incorporated by reference in its entirety.

BACKGROUND OF THE INVENTION

1. Field of the Invention

The present invention generally relates to communication systems, and more particularly to a system and method for encoding DSL information streams having differing latencies.

2. Discussion of the Related Art

In recent years telecommunication systems have expanded from traditional POTS communications to include high-speed data communications as well. As is known, POTS communications include not only the transmission of voice information, but also PSTN (public switched telephone network) modem information, control signals, and other information that is transmitted in the POTS bandwidth, which extends from approximately 300 hertz to approximately 3.4 kilohertz.

New, high-speed data communications provided over digital subscriber lines (DSL), such as Asymmetric Digital Subscriber Line (ADSL), Rate Adaptive Digital Subscriber Line (RADSL), High-Speed Digital Subscriber Line (HDSL), etc. (more broadly denoted as xDSL) provide for high-speed data transmissions, as is commonly used in communicating over the Internet. As is known, the bandwidth for xDSL transmissions is generally defined by a lower cutoff frequency of approximately 30 kilohertz, and a higher cutoff frequency which varies depending upon the particular technology. Since the POTS and xDSL signals are defined by isolated frequency bands, both signals may be transmitted over the same two-wire loop.

Indeed, twisted pair public telephone lines are increasingly being used to carry relatively high-speed signals instead of, or in addition to, telephone signals. Examples of such signals are ADSL (asymmetric digital subscriber line), HDSL (High Density Subscriber Line, T1 (1.544 Mb/s), and ISDN signals. There is a growing demand for increasing use of telephone lines for high speed remote access to computer networks, and there have been various proposals to address this demand, including using voice over data systems to communicate signals via telephone lines at frequencies above the voice-band.

As is known, different applications often demand (or at least lend themselves to) different latency requirements. For example, applications of pure data transfer are often not sensitive to latency delays, while real-time voice communications are sensitive to latency delays. As is also known, to accommodate maximum flexibility for providers and end users of ADSL services, forward error correction (FEC) may be selectively applied to the composite data streams to, or from, the central office ADSL modem. This permits FEC to be included or excluded on a data service by data service basis within the composite data stream.

As an example of the mixed requirements for FEC in an ADSL service, consider transmitting a one-way data stream from the central office to a remote unit. The end user may require high reliability on the one-way channel because the channel may contain highly compressed digital data with no possibility for requesting retransmission. For this application, FEC is highly desired. On the other hand, voice services and duplex data services with their own embedded protocols may require minimum latency. As noted above, in real-time voice communication applications, latency delays are undesirable, while small transmission error may be tolerated (manifested as noise, which can be effectively filtered by the listener). Thus, in such an application, FEC may be optional.

FEC involves the addition of redundant information to the data to be transferred. The data to be transferred, along with the redundant data when added together, form what are commonly known as codewords. FEC in ADSL employs Reed-Solomon codes based on symbols of 8 bits to a byte. FEC in ADSL is rate adaptable, providing for various interleave depths and codeword lengths to support a range of data rates while maintaining constant interleave latency. An enhancement to FEC involves shuffling or interleaving the encoded data prior to transmission, then unshuffling or deinterleaving the data received at the remote DSL modem. Interleaving ensures that bursts of error noise during data transmission do not adversely affect any individual codeword in the transmission. If noise affects a particular frame of data, only a minimum number of bytes of any particular codeword will be affected as the individual codewords are distributed across multiple frames.

The combination of Reed-Solomon encoding with data interleaving is highly effective at correcting errors caused by impulse noise in the service subscriber's local loop. In convolutional interleaving, after writing a byte into interleave memory, a previously written byte is typically read from the same memory.

Standard T1.413, Interface between Networks and Customer Installation—ADSL Metallic Interface provides for convolutional interleaving/deinterleaving along with Reed-Solomon coding as part of forward error correction (FEC). The standard provides an effective method for dealing with burst error channels in modem telecommunication systems. In DMT systems, two latency channels are supported: interleave data and fast data (without interleaving). Convolutional interleaving/deinterleaving is typically implemented by processing the Reed-Solomon encoded digital data sequence through a linear finite state shift register. In high bit rate applications like DMT, a random access memory (RAM) device may be used as the data storage means. Convolutional interleaving/deinterleaving is computation intensive. In software approaches that use a single address pointer and several modulo and addition operations to update the address pointer, system level concurrency and performance is adversely affected. Conversely, hardware approaches that utilize multiple pointers for interleaving/deinterleaving operations increase the complexity of the overall DSL system. The system performance trade-off introduced by FEC in the form of Reed-Solomon coding and convolutional interleaving can be described as increased data transmission reliability at the expense of increased channel latency.

U.S. Pat. No. 5,764,649 to Tong discloses a system and method compliant with the T1.413 standard. As illustrated in the '649 patent, both a "fast path" and an interleave path are provided downstream of the FEC. As taught in the '649 patent, two frames are output from multiplexer every frame period. One frame is sent through ADSL transmitter along a "fast path" while the other frame is sent along an "interleave path." The fast path is so called simply because the data does not undergo the additional processing of interleaving, and therefore does not experience the additional delay imposed by de-interleaving at the receiving end of the communication system. However, all data from the incoming bit stream is passed through the FEC, and therefore encounters the latency delay associated therewith.

Accordingly, there is a need to provide an improved system and method for encoding DSL information streams to further minimize latency delays. Further, there is a desire to provide an improved system and method for encoding DSL information streams having differing latencies.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for encoding a DSL information bit stream and decoding a corresponding encoded DSL symbol. In accordance with one embodiment, an apparatus for encoding a DSL information bit stream is provided having a switch with an input configured to receive a DSL information bit stream and at least two outputs. An encoder is provided and coupled to a first output of the switch. A serial to parallel converter is provided and coupled to both an output of the encoder and a second output of the switch. Finally, a mapper is provided and coupled to an output of the serial to parallel converter through multiple paths. Preferably, a first coupling path between the serial to parallel converter and the mapper is a direct path and a second coupling path includes a second encoder.

In accordance with another embodiment, an apparatus is provided for decoding an encoded DSL symbol. The apparatus includes a soft demapper configured to generate multiple outputs, including an uncoded bit stream having an input configured to receive a DSL information bit stream and at least one coded bit stream. The apparatus further includes at least one decoder configured to decode the at least one coded bit stream. Finally, the apparatus includes a circuit configured to perform a hard demapping of both the uncoded bit stream and an output of the at least one decoder.

In accordance with yet another embodiment of the invention, a method is provided for encoding a DSL information bit stream. Preferably, the method operates by providing at least two paths between an input configured to receive the DSL information bit stream and a serial to parallel converter. The method providing a first encoder in one of the at least two paths, and switches the DSL information bit stream through one of the at least two paths based upon a latency in the DSL information bit stream.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
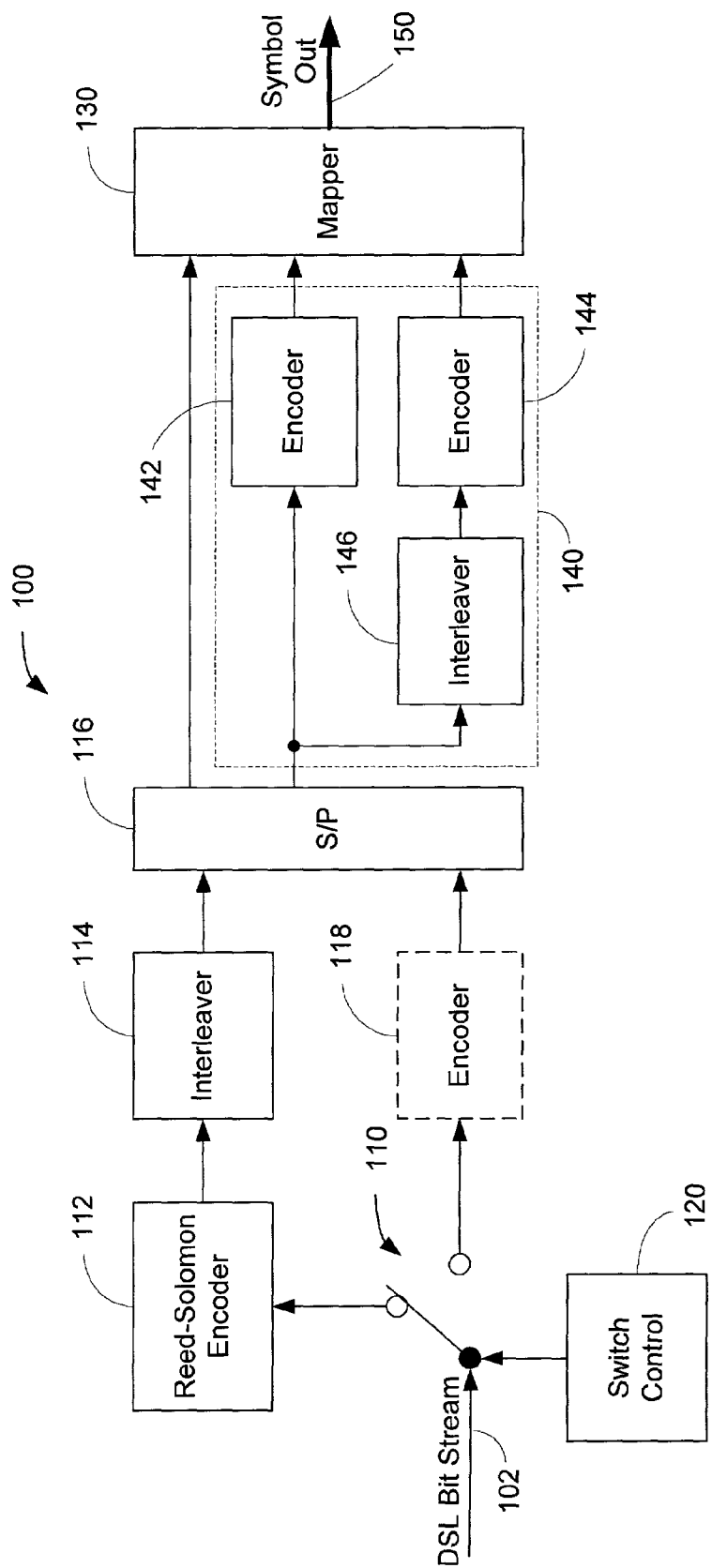
FIG. 1 is a diagram illustrating fundamental components in a transmitter constructed in accordance with one embodiment of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIG. 1, which is a block diagram showing an apparatus 100 for encoding a DSL bit stream 102 in accordance with one embodiment of the present invention. In this regard, a fundamental aspect of the preferred embodiment of the invention relates to the ability to vary the level or depth of encoding of a DSL bit stream, based upon the desired latency in communicating that bit stream. As previously described, certain applications like data transfer may not be sensitive to latency delays, and therefore a higher degree of encoding is often desired. Other applications, like voice communications, desire minimal latency delays, while tolerating certain levels of transmission error. Therefore, in accordance with a fundamental aspect of the preferred embodiment, a mechanism is provided for switching a DSL bit stream 102 between a low latency path and a higher latency path within the apparatus 100.

In this regard, a switching mechanism 110 is provided. In the diagram of FIG. 1, the switching mechanism 110 is illustrated as a simple two-position switch. It should be appreciated that this depiction has been presented purely for illustration purposes and that, in the preferred embodiment, electronic switching elements (e.g., solid state switching elements) may be desired. In a first position (the position illustrated in FIG. 1), the switching mechanism 110 connects the DSL bit stream 102 through a high latency path, which includes a forward error-correction encoder (FEC), such as a Reed-Solomon encoder 112 and an interleaver 114. It will be appreciated that other types of FEC may be implemented in the high latency path. For purposes of the preferred embodiment, an encoder is provided in this high latency path to provide an additional measure of error correction capability, so that the DSL bit stream may be encoded and transmitted to a receiver with greater immunity to channel noise or other interference.

In a second position, the switching mechanism 110 may connect the DSL bit stream 102 directly to a serial to parallel converter 116. In the illustrated embodiment, an additional encoder 118 (an outer block code) may be included to provide a smaller, but additional measure of error correction to the transmitted symbol.

Of course, a mechanism 120 is also provided to control the operation of the switching mechanism 110. The switch control mechanism 120 controls the position of the switching mechanism 110 in accordance with the latency demands of the DSL bit stream 102. In this regard, the switch control mechanism 120 is provided with some indication as to the type of information being conveyed in the DSL bit stream 102. This information may be ascertained by the switch control mechanism 120 evaluating the signals on the DSL bit stream 102 themselves. Alternatively, this information may be provided through network layer transport mechanisms communicating to the switch control mechanism 120. For purposes of the present invention, the implementation of the switch control mechanism is not deemed to be relevant, as the particular implementation of this device or feature is not considered to be a limitation upon the present invention.

As illustrated, the output of the interleaver 114 is also directed to the serial to parallel converter 116. The parallel data that is output from the serial to parallel converter 116 is then directed to a mapper 130 (also referred to as a symbol selector). In a manner that is known and understood by persons skilled in the art, the mapper 130 operates to select or generate an output symbol (e.g., constellation point). Although various encoders may be utilized consistent with the scope of the invention, in the preferred embodiment, the encoder 140 is implemented as a parallel concatenated encoder (or turbo coder), which includes encoders 142 and 144 and an interleaver 146. Concatenated codes are now well known and need not be described herein. As will be appreciated, additional levels or degrees of coding may be added consistent with the invention.

Accordingly, what is generally illustrated in FIG. 1 is a transmitter/encoder for receiving a DSL bit stream 102 and generating a series of output symbols at 150, which can have varying degrees of error correction coding (i.e., redundancy), based upon the desired or acceptable latency of the information being communicated through the DSL bit stream 102. In this regard, a switching mechanism 110 is configured and controlled by a switch control mechanism 120 to direct DSL bit stream 102 through either a higher latency path (comprising additional levels of error correction coding, such as FEC) or a lower latency path, which implements a lower degree of error correction coding.

Figure 2:
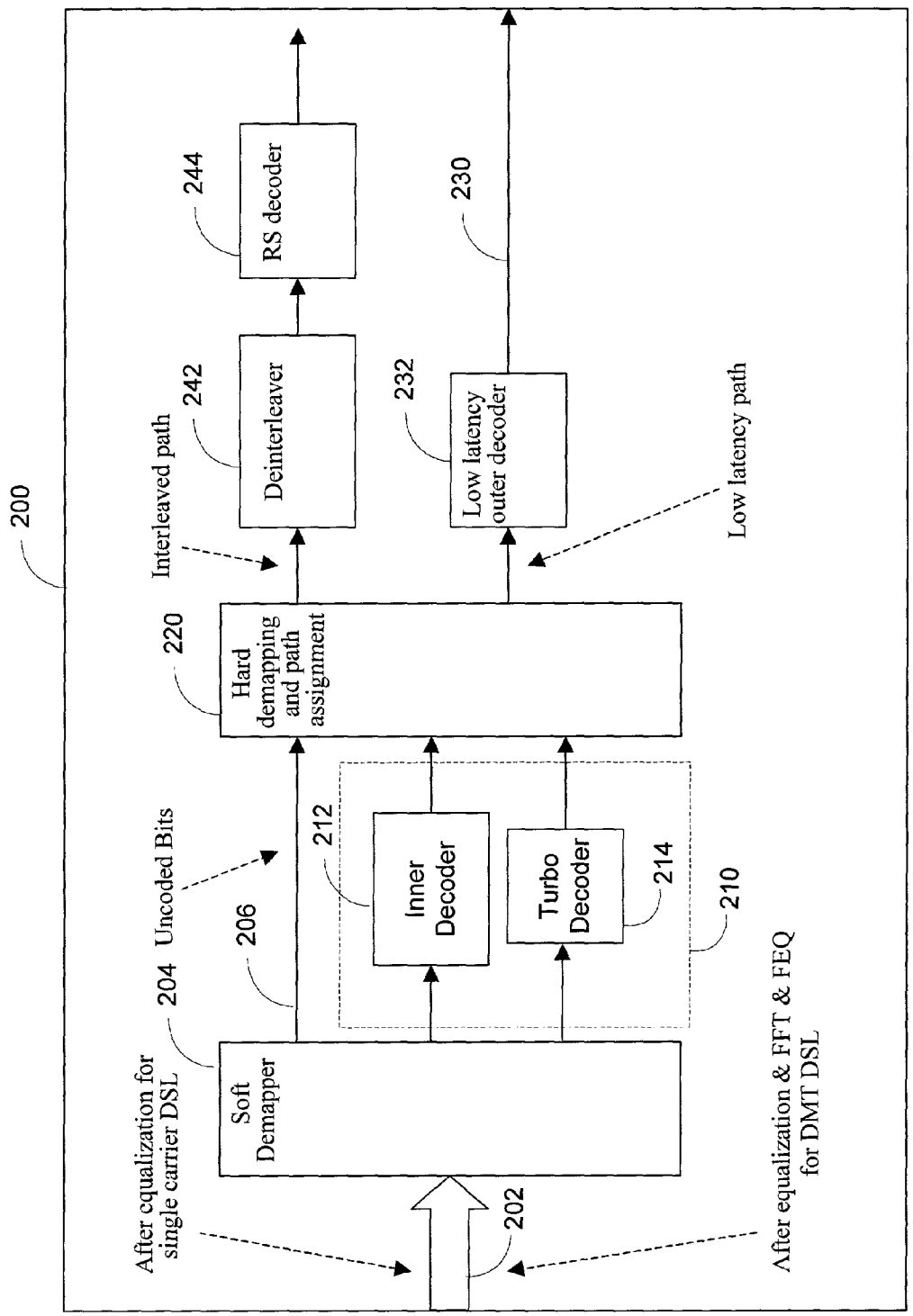
FIG. 2 is a diagram illustrating fundamental components in a receiver constructed in accordance with one embodiment of the invention.

Reference is made now to FIG. 2, which is a block diagram illustrating certain fundamental components implemented in a receiver constructed in accordance with a preferred embodiment of the invention. The illustrated input 202 is taken at a point in a receiver after equalization has been performed in a single carrier modulation. In multicarrier modulations (e.g., DMT DSL), the input 202 is taken at a point in the receiver after the equalization and FFT and FEQ. The symbol received on the input 202 is then operated upon by a demapper 204. The demapper 204 operates to essentially perform the inverse of the mapper 130 illustrated in FIG. 1. As is known, due to noise and interference incurred in the communication channel, the received symbols generally do not exactly correspond to a constellation point. Instead, certain "decisions" must be made to determine the constellation point that is properly associated with the received symbol. As is well known, there are various mechanisms for implementing this type of decision making process. In the preferred embodiment, a "soft" demapper 204 is implemented. A more detailed discussion of the soft demapping process implemented in the preferred embodiment will be described in more detail below. For purposes of the broader concepts of the invention, however, any appropriate or conventional demapper may be utilized.

As illustrated, multiple outputs are generated from the soft demapper 204. The decoder 210 may be configured to perform the inverse of the operation of the encoder 140 of FIG. 1. In the preferred embodiment, the decoder 210 includes decoders 212 and 214. The output from the decoder 210, as well as the uncoded bits 206, are directed to a hard demapping circuit 220. As will be appreciated by persons skilled in the art, since the modulation is a coded modulation, a soft demapper is first implemented before performing the hard demapping.

The circuit 220 also operates to determine whether the transmitted signal was generated through the low latency path or high latency path illustrated in FIG. 1. If the symbol was generated through the low latency path, then the circuit 220 operates to assign the output to a first output path 230. As illustrated, the signal output path 230 may be processed by a low latency outer decoder 232, if the encoder 118 was provided and implemented in FIG. 1. Alternatively, the circuit 220 outputs the signal onto path 240, which is passed through an interleaver 242 and Reed-Solomon decoder 244. As should be understood, the deinterleaver 242 performs the inverse operation of interleaver 114, while the Reed-Solomon decoder 244 performs the inverse operation to the Reed-Solomon encoder 112.

Figure 3:
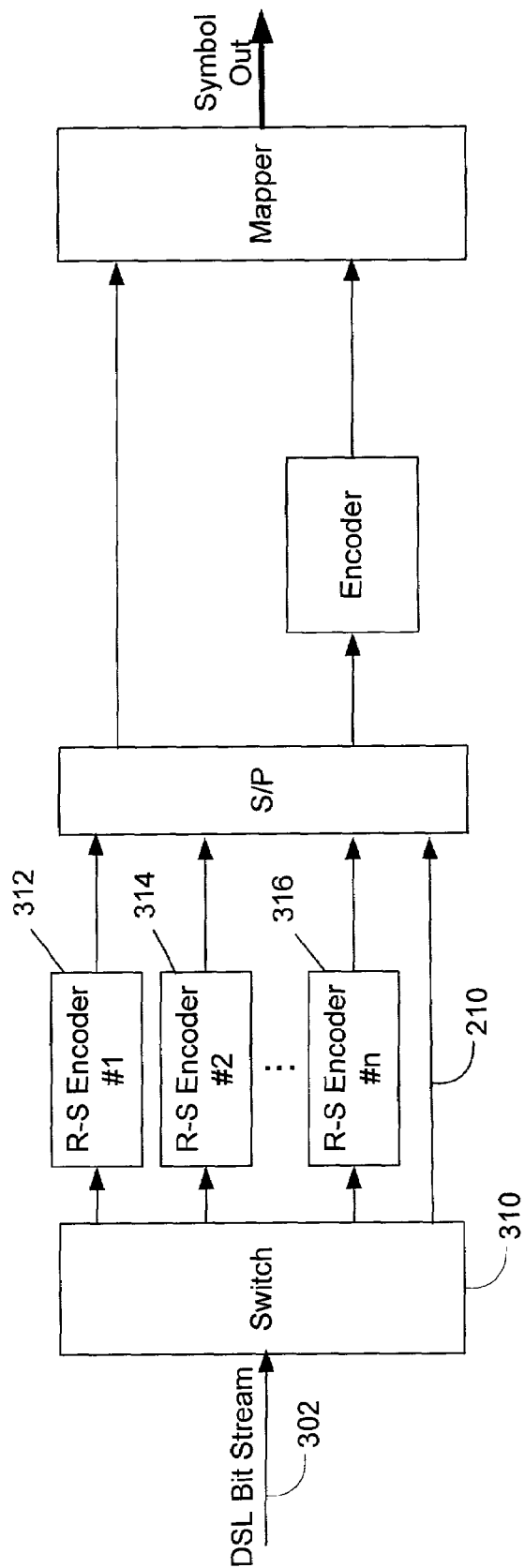
FIG. 3 is a block diagram similar to FIG. 1, but illustrating fundamental components in a transmitter constructed in accordance with another embodiment of the invention.

Reference is now made briefly to FIG. 3, which is a block diagram similar to the diagram of FIG. 1, but illustrating other concepts of one implementation of the present invention. Specifically, in accordance with the broader concepts and teachings of the present invention, it should be understood that the DSL bit stream may be processed in accordance with more than two degrees or levels of latency. In this regard, a switch 310 may be provided to receive the DSL bit stream 302 and directed to any of a number of Reed-Solomon encoders, each Reed-Solomon encoder 312, 314, and 316 having a differing degree of decoding and differing depths of interleaving. Consequently, the error correction capabilities among the various Reed-Solomon encoders 312, 314, and 316 differ. Consequently, the latency associated with each of the Reed-Solomon encoders 312, 314, and 316 differ correspondingly. A direct path 318 between the switch 310 and serial to parallel converter 320 may also be provided. The remainder of the diagram of FIG. 3 may be implemented in the same fashion as that described in connection with FIG. 1.

Although not specifically shown, the implementation of a receiver for receiving a symbol generated by the circuitry of FIG. 3, could be implemented similarly to the receiver of FIG. 2. However, instead of having a single deinterleaving 342 and Reed-Solomon decoder 244, multiple deinterleavers and multiple Reed-Solomon decoders would be provided.

In accordance with yet another embodiment of the invention, a method is provided for encoding a DSL information bit stream. As should be appreciated from the foregoing discussion, the method operates by providing at least two paths between an input configured to receive the DSL information bit stream and a serial to parallel converter. The method providing a first encoder in one of the at least two paths, and switches the DSL information bit stream through one of the at least two paths based upon a latency in the DSL information bit stream.

Figure 4:
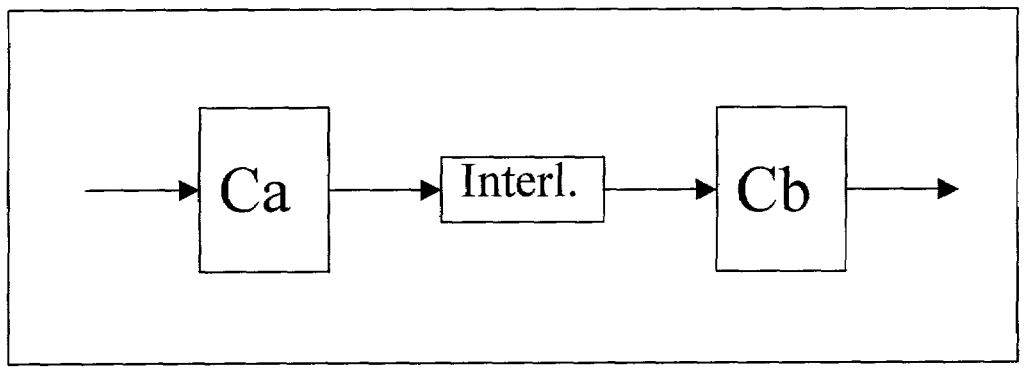
FIG. 4 is a block diagram illustrating a serial concatenated turbo encoder.

Having described the top-level architecture and operation of a system and method constructed in accordance with the invention, the discussion will now focus on implementation details of certain preferred embodiments of the invention. For example, FIGS. 2 and 4 summarily described the use of encoders (e.g., 142 and 144) in the transmitter, at the input of the mapper 130. Consistent with the invention, various types of encoders may be implemented. In the preferred embodiment, however, concatenated codes (sometimes referred to as turbo codes) are implemented.

As is known, turbo codes cover channel coding techniques that combine at least 2 "light codes" at the transceiver side, separated by a decoupling device such as an interleaver, and jointly soft decode them iteratively at the receiver side, in order to benefit from the performance of the equivalent "longer code" at a reasonable price. In this regard, the "turbo" effect takes place at the receiver side, insofar as performance is increased since the 2 soft input soft output SISO decoders (See FIG. 7) dedicated to each code exchange soft information that describes the reliability of the hard decision that could have been made if hard decoding had been used. It should be appreciated that the same information has been coded twice. When the reliability is high enough, a hard decision is finally made. Therefore, the term "turbo codes" may be somewhat misleading, since truly the codes used are "concatenated," and the decoder is, as a matter of fact, a soft turbo-decoder. In the name turbo code, "turbo" thus refers to the fashion of decoding. In addition, the soft information that propagates from one SISO decoder to the other one is generally called "extrinsic information."

Figure 5:
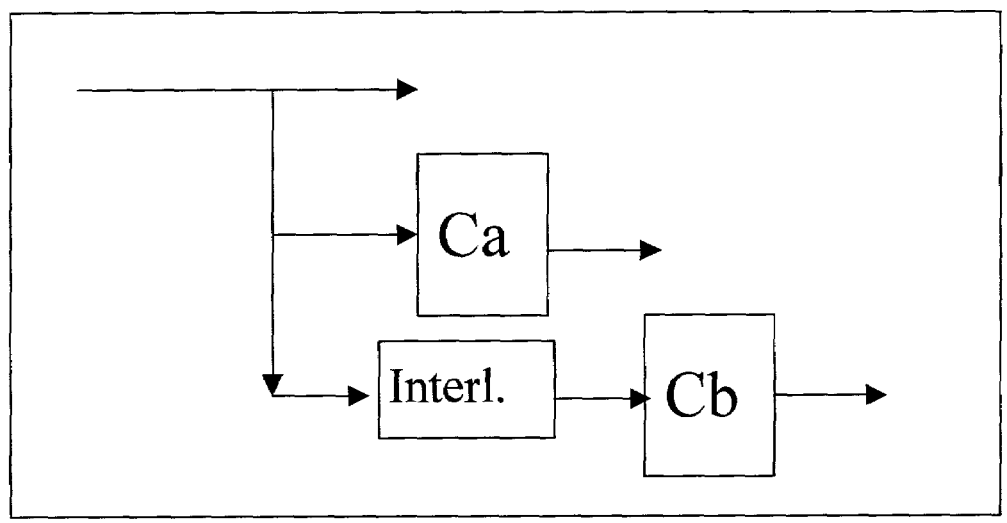
FIG. 5 is a block diagram illustrating a parallel concatenated turbo encoder.

The two generally two categories or families of turbo codes: convolutional turbo codes and block turbo codes. As is known, convolutional turbo codes combine two convolutive codes $C_b$ and $C_a$ either in a serial (FIG. 4) or parallel (FIG. 5) fashion. As mentioned in the turbo code definition, to be full a "turbo code scheme" requires a SISO soft input soft output decoder for each code. Most SISO decoders involved in convolutive turbo codes (either parallel or serial) make use of Soft Output Viterbi Algorithm or simplified versions of the Optimum MAP BCJR algorithm. Since these methodologies and implementations are known by persons skilled in the art, they need not be further described herein.

Figure 6:
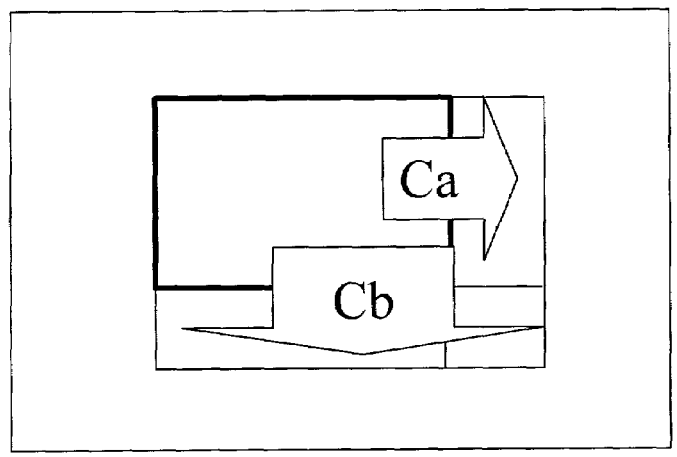
FIG. 6 is a diagram illustrating a product block code encoding scheme.

In the preferred embodiment of the invention, the encoders are implemented as product block turbo codes. As is known, product block codes have long been known. However, the iterative hard decoding for such codes is to be tedious and yields bad performance. Product block turbo codes lift the intrinsic "hard iterative decoding" limitation by introducing a "soft iterative procedure". Product Block codes put the information bits in a matrix fashion (see FIG. 6). A first block code $C_a$ encodes the rows, a second block code $C_b$ encodes the columns (including the parity columns). More features of Product Block Codes are discussed below.

The SISO block decoder (FIG. 7) involves in product block codes is based on what is referred to as the CHASE algorithm, which will be further detailed below. One of the classical and difficult issue in channel coding concerns the choice of an efficient code. For Turbo codes, the issue remains. Based on experimental results, it have been found that convolutional turbo codes, either serial or parallel, exhibit good performance for low power & low spectral efficiency applications such as deep space probe. In contrast, product block codes target high spectral effciency projects. Practically, for code rates lower than 0.7, convolutive codes can be used, if the rate goes above this threshold up to 0.9 product block turbo codes are preferred.

Figure 7:
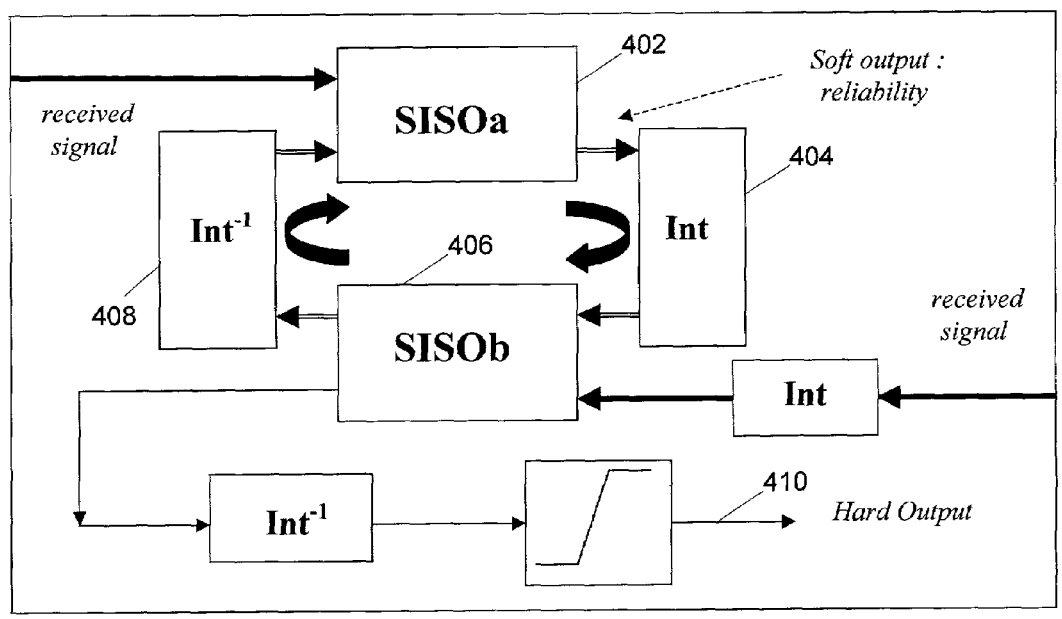
FIG. 7 is a block diagram illustrating an iterative turbo decoding scheme.

Most of the turbo decoders follow the paradigm illustrated in FIG. 7. Raw data are processed first by the Soft Input Soft Output SISO decoder 402 devoted to code a. The relevant soft output, very often called extrinsic information a, is interleaved by interleaver 404 and then processed by the SISO decoder 406. The soft output b is deinterleaved by deinterleaver 408 to feed the next iteration of the turbo decoder.

The soft output or the extrinsic information measures the reliability of the hard decision that could have been made if a hard decoder were used. Therefore, as soon as the process goes through sufficient iterations, the extrinsic information changes according to the improvement of the hard decision that could have been made if a hard decoder were used. When the extrinsic information reaches a steady state, a high reliable "hard decision" is performed to generate a hard output 410. Generally, a few (three to five) iterations are sufficient to get very close to the Shannon bound.

Convolutional SISO algorithms generally rely either on "soft Viterbi algorithm SOVA" or on the known BCJR (Bahl, Cocke, Jelinek, Raviv) algorithm. Both of them model the convolutional code as a finite state Markov Chain. As is known, the Viterbi algorithm estimates the whole state path of the Markov Chain. Although based on a MAP criterion, the Viterbi algorithm is suboptimal, since a certain number of transitions are dropped from time to time to reduce complexity. As is further known, the BCJR algorithm searches for the current and the future states of the Markov Chain at any time according to a MAP criterion. The complexity of SISO schemes devoted to convolutional codes is generally quite high. Conversely, the SISO algorithms used for product block codes are simpler and are based on the Chase algorithm.

General Properties of Product Codes

Figure 8:
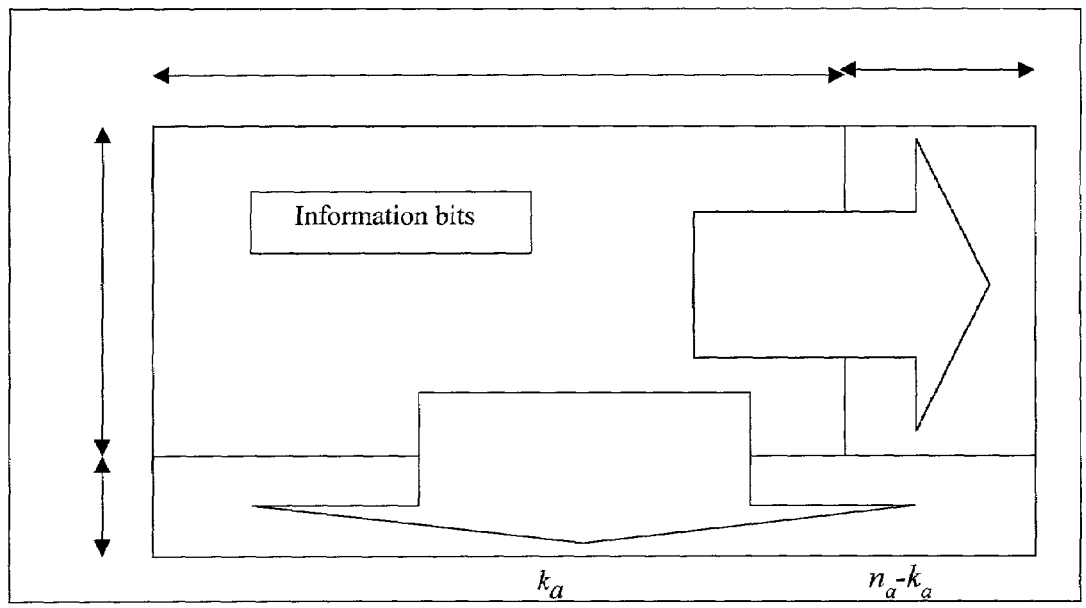
FIG. 8 is a diagram illustrating a product block coding scheme.

As illustrated in FIG. 8, product block codes put the information bits into matrix fashion. The $k_b$ rows are encoded by a first code $C[n_a,k_a,d_a]$, where $d_a$ is the minimum Hamming distance, $k_a$ is the number of information bits, and $n_a$ is the code length. The $n_a$ columns are encoded by a second code $C[n_b,k_b,d_b]$. Therefore all the $n_b$ rows are code words of $C_a$, and all the $n_a$ columns are codewords of $C_b$. The parameters of the product code $C[n, k, d]$ are the product of the elementary codes parameters:

$$n=n_a \times n_b, \quad k=k_a \times k_b, \quad d=d_a \times d_b \qquad \text{Equation 1}$$

Other interesting properties of product block codes are related to the "code spectrum", i.e. the number A(w) of codes words with a certain weight w (number of bits equal to one). The number of code words (of the Product Block Code) with the minimum weight is the product of the number of code words with the minimum weight of the two original codes is given by:

$$A(d_{min})=A_a(d_{min,a})A_b(d_{min,b}) \qquad \text{Equation 2}$$

Soft Decoding of Block Codes: CHASE Algorithm

Complexity of the Maximum Likelihood Approach

Although maximum likelihood decoding is optimum, it generally implies an unrealistic complexity, when the unknown takes discrete values and when their number is higher than 10. Assume, for example, that a row r ($n_a$ components) of the matrix is transmitted. The associated received vector x contains additive noise:

$$x = r + n \quad \text{Equation 3}$$

If the noise is white and gaussian, the maximum likelihood approach looks for the code word, which minimizes the following Euclidian distance is:

$$r^{opt} = ARG\{\text{Min}_{1 \leq i \leq 2^{ka}}\{\|x - r^i\|^2\}\} \quad \text{Equation 4}$$

This requires a search amongst $2^{k_a}$ discrete binary vectors, resulting in an exponentially increasing complexity. In equation 4, $r^i$ designates the "code word i", of code $C_a$:

$$r^i = [r_1^i \ldots r_m^i \ldots r_{n_a}^i] \quad \text{Equation 5}$$

Each component takes binary values 0, or 1.

CHASE proposed an algorithm which approximates the maximum likelihood sequence decoding of block codes with a low computation complexity and a small performance degradation.

CHASE Algorithm

Instead of reviewing all the codes words of $C_a$, the CHASE algorithm searches for these located in a subspace of the code. If a BPSK modulation is used, the received vector, still associated to a row r (for simplicity's sake) is:

$$x = \tilde{r} + n \quad \text{Equation 6}$$

where:

$$\tilde{r}_m = 1, \text{ if } r_m = 1$$

$$\tilde{r}_m = -1, \text{ if } r_m = 0 \quad \text{Equation 7}$$

We denote y, the binary vector deduced after hard slicing of x:

$$y_m = \frac{1}{2}(1 + \text{sgn}[x_m]) \quad \text{Equation 8}$$

The CHASE algorithm is based on 4 steps:

Step 1. Find the P least reliable bits of y.

Step 2. Elaborate the $2^P$ associated "test sequences", $z^i$, $1 \leq i \leq 2^P$.

Step 3. Hard decode the $2^P$ test sequences, store the results which spans the subspace.

Step 4. Decode x based on maximum likelihood in $\tilde{\Omega}$, and compute the reliability of the decision to elaborate the soft output.

With regard to step 1, the P least reliable bits are associated to the P smallest values of $|x_m|$.

With regard to step 2, to built the test sequences, the most reliable bits are kept, and the P least reliable takes any binary values 0, or 1. This leads to $2^P$ possibilities.

With regard to step 4, the likelihood approach limited to leads to the decision d:

$$d = ARG\{\text{Min}\{\|x - \tilde{r}\|^2\}$$

$$\tilde{r} \in \tilde{\Omega} \quad \text{Equation 9}$$

where $\tilde{\Omega}$ is the extension of according to the BPSK modulation, see equation 7. The reliability of decision d is evaluated per bit m. The reliability of bit m is based on the following Log-likelihood ratio:

$$\Lambda(d_m) = \text{Log}\left\{\frac{Pr[\tilde{r}_m = +1/x]}{Pr[\tilde{r}_m = -1/x]}\right\} \quad \text{Equation 10}$$

After some calculation and manipulation, the Log-likelihood ratio becomes approximately:

$$\Lambda(d_m) \approx \frac{1}{2\sigma^2}(\|x - \tilde{r}^{-1(m)}\|^2 - \|x - \tilde{r}^{+1(m)}\|^2) \quad \text{Equation 11}$$

where $\tilde{r}^{-1(m)}$ is the closest code word to x in $\tilde{C}_a$ with bit m equals to $-1$, $\tilde{r}^{+1(m)}$ is the closest code word to x in $\tilde{C}_a$ with bit m equals to $+1$. It is particularly noted that if:

$$d = \tilde{r}^{-1(m)} \quad \text{Equation 12}$$

the Log-likelihood ratio is negative. If:

$$d = \tilde{r}^{+1(m)} \quad \text{Equation 13}$$

the likelihood ratio if positive. Therefore, the Log-likelihood ratio of bit m, bears its sign. The Log-likelihood ratio might be rewritten as:

$$\Lambda(d_m) \approx \frac{1}{2\sigma^2}\|x - \tilde{r}^{-1(m)}\|^2 - \|x - \tilde{r}^{+1(m)}\|^2|d_m \quad \text{Equation 14}$$

Based on a straightforward calculation, it is possible to show that if $\sigma^2 = 2$, then:

$$\Lambda(d_m) \approx x_m + w_m = x'_m \quad \text{Equation 15}$$

where $w_m$ is the extrinsic information stemming from the likelihood evaluation. This extrinsic information is added to the soft input to elaborate the soft output $x'_m$ which reliability is contained in its absolute value: $|x'_m|$. When this absolute value is growing, so does the reliability.

Simplified Soft Output.

The Log-likelihood given by Equation 14 is the "soft output" of the decoding. It becomes an additive correction of the input data for a particular normalization. Nevertheless, the search for both code words $\tilde{r}^{+1(m)}$ and $\tilde{r}^{-1(m)}$ in the whole code $\tilde{C}_a$ is still unrealistic. This optimum soft output may be replaced by the following simplified version in the CHASE algorithm:

$$x'_m \approx \frac{1}{4}(\|x - a\|^2 - \|x - d\|^2)d_m \quad \text{Eqaution 16}$$

where d is the likelihood decision in $\tilde{\Omega}$, $d_m$ is the bit m of d. a is the "challenger" of d. It is the closest (in $\tilde{\Omega}$ code word to x, but with a bit m equal to $-d_m$. According to equation (15), the extrinsic information $w_m$ is the difference:

$$\frac{1}{4}(\|x-a\|^2 - \|x-d\|^2)d_m - x_m = w_m \quad \text{Equation 17}$$

If the challenger a does not exist, than the soft output is chosen to be equal to in coherence with Equations 15 and 16:

$$x'_m = x_m \beta d_m \quad \text{Equation 18}$$

Figure 9:
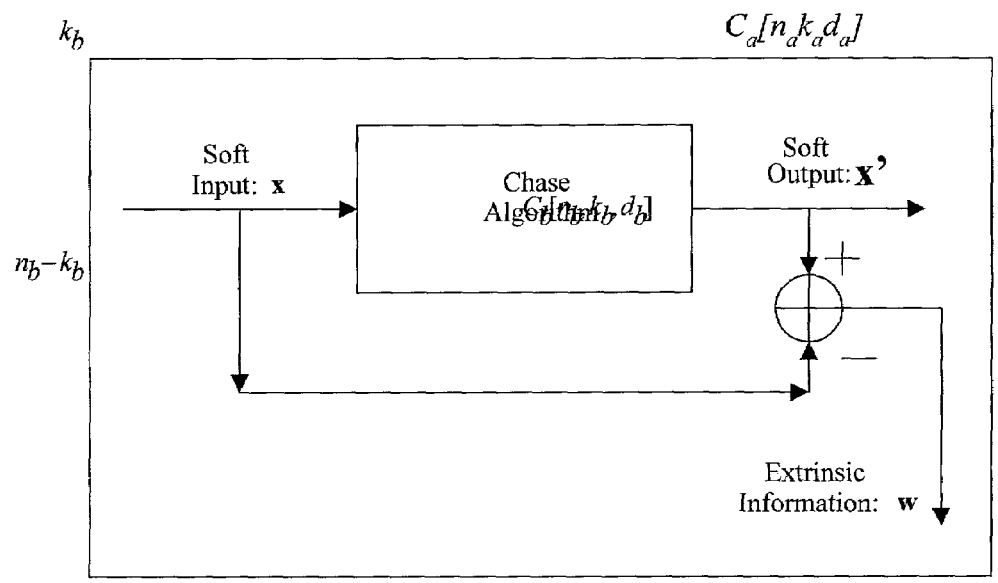
FIG. 9 is a diagram illustrating extrinsic information generated by the Chase algorithm.

As a summary, for BPSK modulation, the CHASE algorithm associates to a soft input x a soft output x' (according to either Equation 15 or 16). Their difference is the extrinsic information w (see FIG. 9).

As a compact useful notation, consider:

$$\text{CHASE}[x] = x' \quad \text{Equation 19}$$

Iterative Soft Decoding of Product Block Codes: Block Product Turbo Codes for BPSK Modulation Assuming that the received data consists in a matrix X with $n_a$ columns and $n_b$ rows, according to the fashion described above. One iteration of the turbo decoding of X is split into two "half iterations": the soft decoding of all the rows on the one hand and all the columns on the other hand, based both on the CHASE algorithm.

The iterative scheme is as follows.

Iteration 0

First Half Iteration 0. Rows. Soft decode all the rows of matrix X. Half iteration 0 does not use any extrinsic information as input. Denoting $SI_R[0,0]$ as the soft input at the half iteration 0 (the index R stands for rows, although it could be of course replaced by the same operation on the columns). The soft output $SO_R[0,0]$ after the first half iteration 0 may be obtained by soft decoding (based on the CHASE algorithm devoted to code $C_a$) of all the rows of X. In summary, $$SI_R[0,0] = X$$

$$SO_R[0,0] = \text{CHASE}_R[X]$$

$$W_R[0,0] = SO_R[0,0] - SI_R[0,0] \quad \text{Equation 20}$$

Second Half iteration 0, Columns. The soft input of the second half iteration 0 $SI_C[0,1]$ includes part of the extrinsic information stemming from the first half iteration 0:

$$SI_C[0,1] = X + \alpha[0,1] W_R[0,0] \quad \text{Equation 21}$$

The soft output of the second half iteration $SO_C[0,1]$ results from the soft decoding (based on the CHASE algorithm devoted to code $C_b$) of all the columns of the soft input given by Equation 21:

$$SO_C[0,1] = \text{CHASE}_C[SI_C[0,1]] \quad \text{Equation 22}$$

The relevant extrinsic information $W_C[0,1]$ is still the difference between the soft output and the soft input:

$$W_C[0,1] = SO_C[0,1] - SI_C[0,1] \quad \text{Equation 23}$$

At the first iteration, the extrinsic information is not highly reliable, the reliability increases with each iteration. The extrinsic information which feeds the next SISO block is thus weighted by a coefficient tuned according to the iteration. This coefficient is increasing from 0 to 1.

Iteration m+1. $m \geq 0$

First half iteration m+1. Rows.

Soft Input: $SI_R[m+1,0] = X + \alpha[m+1,0]W_C[m,1]$

Soft Output: $SO_R[m+1,0] = \text{CHASE}_R[SI_R[m+1,0]]$

Extrinsic Information: $W_R[m+1,0] = SO_R[m+1,0] - SI_R[m+1,0]$.

Second half iteration m+1. Columns.

Soft Input: $SI_C[m+1,1] = X + \alpha[m+1,1]W_R[m+1,0]$

Soft Output: $SO_C[m+1,1] = \text{CHASE}_C[SI_C[m+1,1]]$

Extrinsic Information: $W_C[m+1,1] = SO_C[m+1,1] - SI_C[m+1,1]$.

Generally 3 to 4 iterations are sufficient to lead to almost the maximum expected gain of turbo decoding.

Block Product Turbo Codes for ADSL DMT

Extension to the ADSL-DMT Constraints

The idea is to replace the actual coded QAM modulation, the interleaver and the Reed-Solomon code by both a soft demapper of QAM and a block product turbo BCH code. In what follows, we will refer to the "classical chain" as the chain without turbo codes. The matrix fashion inherent to block product behaves as a matter of fact as an interleaver. To introduce block product turbo codes requires the satisfaction of ADSL constraints.

Block Product Turbo BCH, BPTBCH, Scheme Suited to ADSL Framing Constraints

The Reed-Solomon leads to 255 bytes words. BCH codes are binary cyclic codes. BCH codes with 255 bits are thus convenient (8 BCH words fit one RS word). Starting from the fact that the rate of the product block code is the product of the original rates, to keep a reasonable rate, consider $(255,247)^2$BPTBCH and $(255,247)(255,239)$ BPTBCH with respective rates equal to 0.937 and 0.907. Both schemes are equivalent to an interleaver depth of at least 29 bytes.

Soft Demapping

The following presents a mathematical discussion (and illustration) of soft demapping. It should be appreciated that the following is presented purely for the purpose of illustration, and should not be viewed as limiting in any way upon the broader concepts of the present invention.

ML Partitioning of the Real Axis

For simplicity, consider an 8 PAM, based on 3 bits, $b_2 b_1 b_0$ and a Gray labeling (see FIG. 11). We introduce also the ML partition of the real axis in the presence of additive white gaussian noise. This means that the 8 classes $C_k$, $0 \leq k \leq 7$ associated to each of the 8 three bits words are based on the middle of the segments defined by the values associated to each of the 8 three bits words (see FIG. 10). We call r the received information. The target is to define a soft information for each of the three bits $b_2 b_1 b_0$, based on r. The "optimum" soft information makes use of the MAP or the Log(MAP) ratio:

$$L_1(r) = \frac{p(b_1 = 1/2)}{p(b_1 = 0/r)} = \frac{\sum_{b_1} p(b_{-1}, b_2 = 1/r)}{\sum_{b_{-1}} p(b_{-1}, b_2 = 0/r)} \quad \text{Equation 24}$$

where $b_{-1}$ is the 2 bits word built with the bits different from i. Instead of considering the Max[Log(MAP)] argument and the Bayes rule to simplify Equation 25, we introduce the simple idea of "tangent BPSK" modulation.

Soft Bits Based on "Tangent BPSK" Modulation

Figure 10:
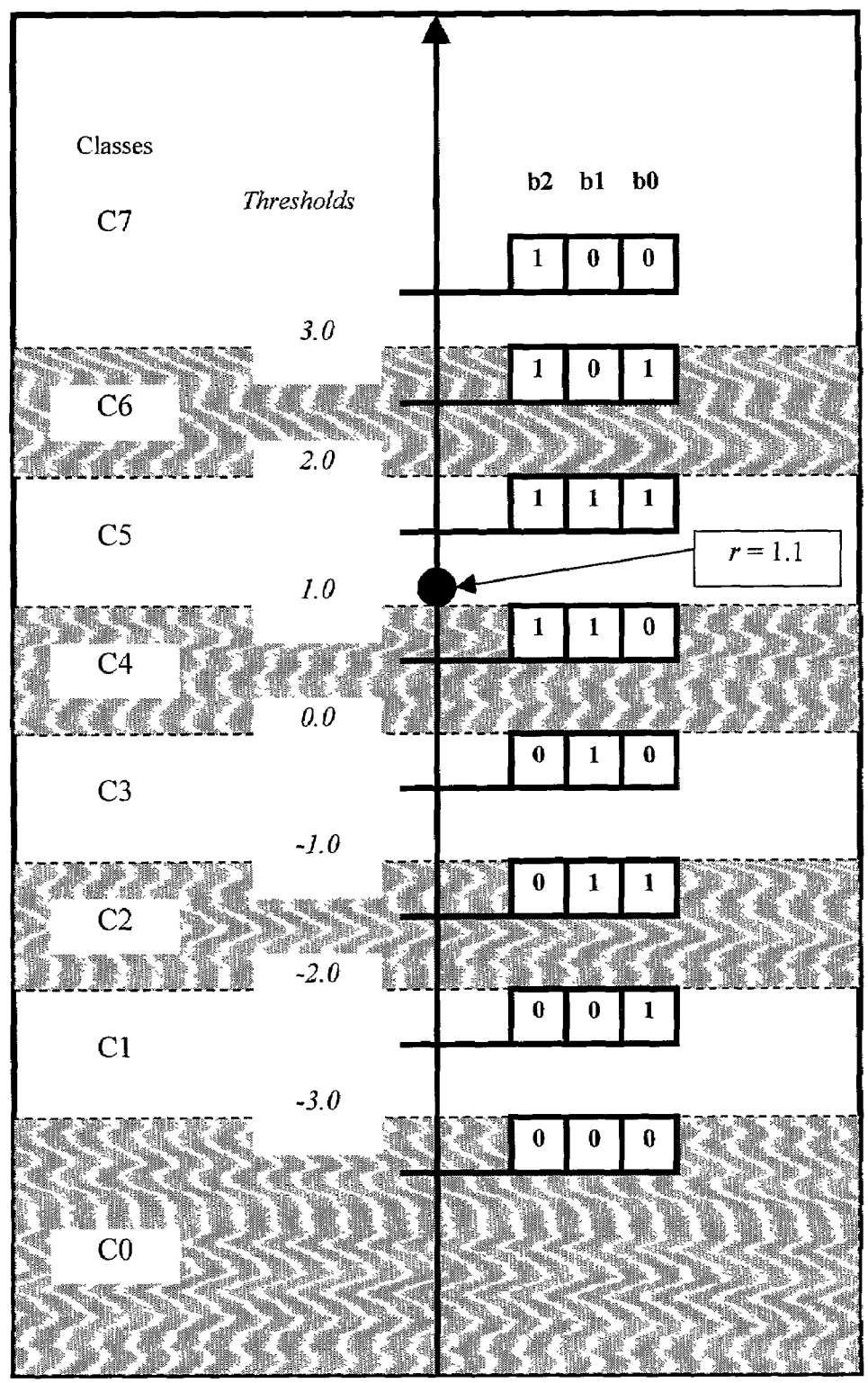
FIG. 10 is a diagram illustrating an 8 PAM with three bits and Gray labeling.

To explain the idea of "tangent BPSK" modulation, we consider an example and assume that r=1.1 (see FIG. 10). Our procedure yields "soft bits" $b_i(r) 0 \leq i \leq 2$ based on r. First of all, a class membership is defined, straightforwardly $C_5$ in FIG. 10. Then, one "tangent BPSK" modulation is introduced per bit, conditionally to class $C_5$.

a) Soft bit $\tilde{b}_0(r)$. In class $C_5$, $b_2b_1b_0$=111. The present procedure states 110 as the "challenger" of 111 for bit $b_0$. The relevant "tangent BPSK" modulation takes place between 111 and 110. The relevant values have thus to be tuned based on translation and scaling to lead to "BPSK like" ranges:

$$\tilde{b}_0(r)=r-1=0.1 \qquad \text{Equation 25}$$

b) Soft bit $\tilde{b}_1(r)$. In class $C_5$, $b_2b_1b_0$=111. The present procedure states 101 as the "challenger" of 111 for bit $b_1$. The relevant "tangent BPSK" modulation takes place between 111 and 101. The relevant values have thus to be tuned based on translation and scaling to lead to "BPSK like" ranges:

$$b_1(r)=r-2=-0.9 \qquad \text{Equation 26}$$

c) Soft bit $\tilde{b}_2(r)$. In class $C_5$, $b_2b_1b_0$=111. The present procedure states 011 as the "challenger" of 111 for bit $b_2$. The relevant "tangent BPSK" modulation takes place between 111 and 011. The relevant values have thus to be tuned based on translation and scaled to lead to "BPSK like" ranges:

$$\tilde{b}_2(r) = \frac{r}{3} = 0.36 \qquad \text{Equation 27}$$

Then, any SISO BPSK (+0.5, −0.5) based procedure may be processed.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for encoding a DSL information bit stream comprising:
   a switch having an input configured to receive a DSL information bit stream and at least two outputs, including a first switch output and a second switch output;
   a first encoder having an input coupled to the first switch output;
   a serial to parallel converter coupled to both an output of the first encoder and the second switch output;
   a mapper coupled to an output of the serial to parallel converter through multiple paths, wherein a first coupling path is a direct path and a second coupling path includes a second encoder.

2. The apparatus of claim 1, wherein the first encoder is a Reed-Solomon encoder.

3. The apparatus of claim 1, wherein the second encoder is a block turbo encoder.

4. The apparatus of claim 1, wherein the second encoder is a convolutional turbo encoder.

5. The apparatus of claim 1, further including an interleaver interposed between the first encoder and the serial to parallel converter.

6. The apparatus of claim 1, further including a mapper directly coupled to an output of the serial to parallel converter.

7. The apparatus of claim 6, further including a second encoder interposed between the serial to parallel converter and the mapper.

8. The apparatus of claim 7, wherein the second encoder is a concatenated encoder.

9. The apparatus of claim 7, wherein the second encoder is a turbo coder.

10. The apparatus of claim 9, wherein the turbo coder is a convolutional turbo coder.

11. The apparatus of claim 1, further including a third encoder interposed between the second switch input and the serial to parallel converter.

12. The apparatus of claim 1, further including a controller for controlling the operation of the switch based upon the latency of the DSL information bit stream.

13. An apparatus for encoding a DSL information bit stream comprising:
   a switch having an input configured to receive a DSL information bit stream and at least three outputs;
   a plurality of encoders, each encoder coupled to a different output of the switch and each encoder defined by a different interleaving depth;
   a serial to parallel converter coupled to an output of each of the plurality of encoders; and a mapper coupled to an output of the serial to parallel converter through multiple paths, wherein a first coupling path is direct path and a second coupling path includes a second encoder.

14. The apparatus of claim 13, wherein the serial to parallel converter is also coupled directly to one of the switch outputs.

15. The apparatus of claim 13, wherein each of the plurality of encoders are Reed-Solomon encoders.

16. A method for encoding a DSL information bit stream comprising:
   providing at least two paths between an input configured to receive the DSL information bit stream and a serial to parallel converter;
   providing a first encoder in one of the at least two paths; and
   switching the DSL information bit stream through one of the at least two paths based upon a latency in the DSL information bit stream; and providing a mapper coupled to an output of the serial to parallel converter through multiple paths, wherein a first coupling path is direct path and a second coupling path includes a second encoder.

17. An apparatus for decoding an encoded DSL symbol comprising:
   a soft demapper configured to generate multiple outputs, including an uncoded bit stream having an input configured to receive a DSL information bit stream and at least one coded bit stream;
   at least one decoder configured to decode the at least one coded bit stream;
   a circuit configured to perform a hard demapping of both the uncoded bit stream and an output of the at least one decoder; and a deinterleaver configured to operate on an output of the hard demapper corresponding to a demapping of the uncoded bit stream.

18. The apparatus of claim 17, further including an Reed-Solomon decoder configured to decode an output of the deinterleaver.

19. The apparatus of claim 17, wherein the circuit is implemented primarily through dedicated hardware.

20. The apparatus of claim 17, wherein the circuit is implemented through general purpose hardware that is micro-coded with instructions to carry out the demapping function.

* * * * *